(12) United States Patent
Mohlman et al.

(10) Patent No.: US 11,383,963 B2
(45) Date of Patent: Jul. 12, 2022

(54) OBSTACLE DETECTION SYSTEM FOR AN AERIAL WORK PLATFORM

(71) Applicant: JLG Industries, Inc., McConnellsburg, PA (US)

(72) Inventors: Brian K. Mohlman, Hagerstown, MD (US); Matthew I. Gilbride, Frederick, MD (US); David W. Lombardo, Walkersville, MD (US); Ignacy Puszkiewicz, Hagerstown, MD (US)

(73) Assignee: JLG INDUSTRIES, INC., McConnellsburg, PA (US)

( * ) Notice: Subject to any disclaimer, the term of this patent is extended or adjusted under 35 U.S.C. 154(b) by 680 days.

(21) Appl. No.: 15/904,682

(22) Filed: Feb. 26, 2018

(65) Prior Publication Data
US 2018/0251354 A1    Sep. 6, 2018

Related U.S. Application Data

(60) Provisional application No. 62/466,501, filed on Mar. 3, 2017.

(51) Int. Cl.
*B66F 11/04* (2006.01)
*B66F 17/00* (2006.01)
(Continued)

(52) U.S. Cl.
CPC .......... *B66F 11/046* (2013.01); *B66F 7/0666* (2013.01); *B66F 9/0755* (2013.01);
(Continued)

(58) Field of Classification Search
CPC .... B66F 11/046; B66F 17/006; B66F 11/042; B66F 11/04; B66F 9/0755; B66F 7/06;
(Continued)

(56) References Cited

U.S. PATENT DOCUMENTS 3,670,849 A    6/1972    Milner, Jr.
3,814,211 A    6/1974    Pamer
(Continued)

FOREIGN PATENT DOCUMENTS

EP    1 452 479    9/2004
JP    5-65994    8/1993
(Continued)

OTHER PUBLICATIONS

Japanese Office Action dated Mar. 19, 2019 issued in Japanese Patent Application No. 2018-037181 and English translation, 15 pp.
(Continued)

*Primary Examiner* — Mathew Franklin Gordon
(74) *Attorney, Agent, or Firm* — Nixon & Vanderhye P.C.

(57) ABSTRACT

A platform assembly includes a work platform including a platform floor and a safety rail extending from the platform floor to a rail height, and a primary sensor unit secured to the work platform and positioned adjacent the platform floor. The primary sensor unit is configured to monitor an area from the platform floor to a space above the rail height and forward and aft of the work platform. The platform assembly enhances protection for an operator from sustained involuntary operation resulting in an impact with an obstruction or structure.

14 Claims, 4 Drawing Sheets

(51) Int. Cl.
*B66F 9/075* (2006.01)
*B66F 7/06* (2006.01)

(52) U.S. Cl.
CPC .......... *B66F 11/042* (2013.01); *B66F 17/006* (2013.01); *G05B 2219/45071* (2013.01)

(58) Field of Classification Search
CPC ................. B66F 7/0683; B66F 7/0666; G05B 2219/45071
See application file for complete search history.

(56) References Cited

U.S. PATENT DOCUMENTS

| | | | |
|---|---|---|---|
| 4,931,930 | A | 6/1990 | Shyu et al. |
| 4,979,588 | A | 12/1990 | Pike et al. |
| 5,004,997 | A | 4/1991 | Shisgal et al. |
| 5,359,542 | A | 10/1994 | Pahmeier et al. |
| 5,363,940 | A | 11/1994 | Fahrion |
| 5,548,515 | A | 8/1996 | Pilley et al. |
| 5,607,282 | A | 3/1997 | Brannen et al. |
| 5,740,047 | A | 4/1998 | Pilley et al. |
| 5,889,479 | A | 3/1999 | Tabei |
| 5,906,648 | A | 5/1999 | Zoratti et al. |
| 5,940,012 | A | 8/1999 | Studebaker |
| 6,294,985 | B1 | 9/2001 | Simon |
| 6,462,697 | B1 | 10/2002 | Klamer et al. |
| 7,194,358 | B2 | 3/2007 | Callaghan et al. |
| 2002/0074186 | A1 | 6/2002 | Baidas et al. |
| 2003/0020610 | A1 | 1/2003 | Swanson et al. |
| 2003/0122666 | A1 | 7/2003 | John et al. |
| 2003/0189487 | A1 | 10/2003 | Mathews et al. |
| 2003/0221916 | A1 | 12/2003 | Dube et al. |
| 2004/0094077 | A1 | 5/2004 | Stone |
| 2005/0187712 | A1 | 8/2005 | Callaghan et al. |
| 2015/0368082 | A1 | 12/2015 | Davis et al. |
| 2016/0098910 | A1* | 4/2016 | Cummings ........... B66F 11/042 340/540 |
| 2017/0233232 | A1* | 8/2017 | Davis ................... B66F 11/042 182/69.5 |

FOREIGN PATENT DOCUMENTS

| | | |
|---|---|---|
| JP | 2011-63352 | 3/2011 |
| JP | 2013-10589 | 1/2013 |

OTHER PUBLICATIONS

Australian Examination Report No. 1 dated Aug. 3, 2018 issued in Australian Patent Application No. 2018201310, 8 pp.
Extended European Search Report dated Jul. 24, 2018 issued in European Patent Application No. 18159117.3, 7 pp.

* cited by examiner

OBSTACLE DETECTION SYSTEM FOR AN AERIAL WORK PLATFORM

CROSS-REFERENCES TO RELATED APPLICATIONS

This application claims the benefit of U.S. Provisional Patent Application No. 62/466,501, filed Mar. 3, 2017, the entire content of which is herein incorporated by reference.

STATEMENT REGARDING FEDERALLY SPONSORED RESEARCH OR DEVELOPMENT (Not Applicable)

BACKGROUND

The invention relates to work platforms and, more particularly, to a work platform including provisions to enhance protection for an operator from sustained involuntary operation resulting in an impact with an obstruction or structure.

Aerial lifts with a work platform supported on an extendable boom have been fitted with sensor systems for preventing or minimizing the impact of overhead crush accidents. With an extendable boom, a safety hazard can occur when an operator is positioned between the platform and a structure that may be located overhead or behind the operator, among other places. A platform may be maneuvered into a position where the operator is crushed between that structure and the platform, resulting in serious injury or death.

Scissor lifts are less susceptible to such safety hazards due to the nature of machine limitations to vertical movement of the platform. An overhead impact hazards still exists, however, and it would be desirable to provide a platform assembly that can detect potential obstacles and hazards with such a machine.

BRIEF SUMMARY

The platform assembly of the described embodiments may incorporate one or more sensor units positioned on an exterior surface of the work platform adjacent the platform floor. The sensors may be configured to provide "fans" of coverage for detecting potential obstacles in a vicinity of the platform. In some embodiments, extendable platforms are accommodated by incorporating an additional sensor looking downward to prevent a potential crushing hazard on any objects/structures below the platform extension in an extended position.

In an exemplary embodiment, a platform assembly includes a work platform including a platform floor and a safety rail extending from the platform floor to a rail height, and a primary sensor unit secured to the work platform and positioned adjacent the platform floor. The primary sensor unit is configured to monitor an area from the platform floor to a space above the rail height and forward and aft of the work platform.

The primary sensor unit may also include two sensors facing in substantially opposite directions, each of the sensors defining a fan of coverage. In this context, the sensors may be positioned relative to each other such that the fans of coverage at least partially overlap. In some embodiments, the two sensors may be oriented about 90° relative to each other. The work platform may be rectangular shaped with two long sides and shorter front and back ends, and the primary sensor unit may be positioned on at least one of the two long sides.

The work platform may also include a platform extension that may be displaceable between a retracted position and an extended position and that extends the platform floor in at least one of a forward and a rearward direction in the extended position. The platform assembly may additionally include a secondary sensor unit positioned adjacent the platform extension and configured to monitor an area below the platform extension. In this context, the platform assembly may also include a target panel positioned on the platform extension and displaceable with the platform extension. The target panel may be in a sight line of the secondary sensor in the extended position, and the target panel may be out of the sight line of the secondary sensor in the retracted position.

In another exemplary embodiment, a scissor lift includes a wheeled chassis, an arm stack supported on the wheeled chassis and displaceable between a raised orientation and a lowered orientation, and the platform assembly of the described embodiments supported on the arm stack and displaceable with the arm stack.

In yet another exemplary embodiment, a platform assembly includes a work platform including a platform floor, two long sides, and a safety rail extending from the platform floor to a rail height, and two primary sensor units secured to the work platform and positioned adjacent the platform floor on each of the two long sides, respectively. The primary sensor units are configured to monitor an area from the platform floor to a space above the rail height and forward and aft of the work platform. The primary sensor units each comprise two sensors facing in substantially opposite directions, each of the sensors defining a fan of coverage.

BRIEF DESCRIPTION OF THE DRAWINGS

These and other aspects and advantages will be described in detail with reference to the accompanying drawings, in which.

DETAILED DESCRIPTION

With reference to the drawings, the platform assembly according to the described embodiments is shown with an exemplary application to a scissor lift. It will be appreciated that the platform assembly may be applicable to other lift vehicle types, and the invention is not necessarily meant to be limited to the exemplary scissor lift application shown and described.

The scissor lift shown in FIGS. 1-4 includes a wheeled chassis 12, an arm stack 14 supported on the wheel chassis 12 and displaceable between a raised orientation and a lowered orientation, and a platform assembly 16 supported on the arm stack via a platform base 18 that is displaceable with the arm stack 14.

Figure 1:
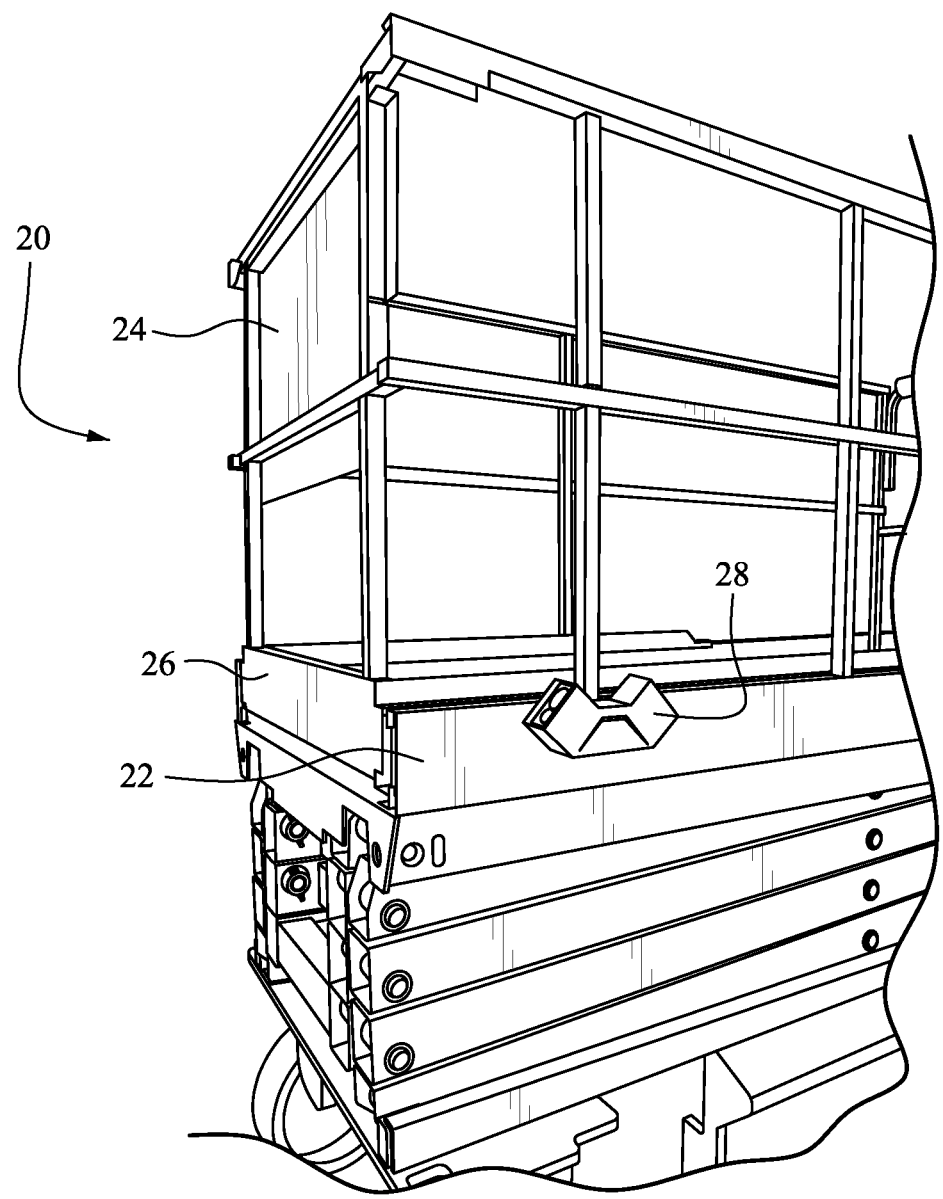
FIGS. 1 and 2 show an exemplary platform assembly including a sensor unit.
Figure 2:
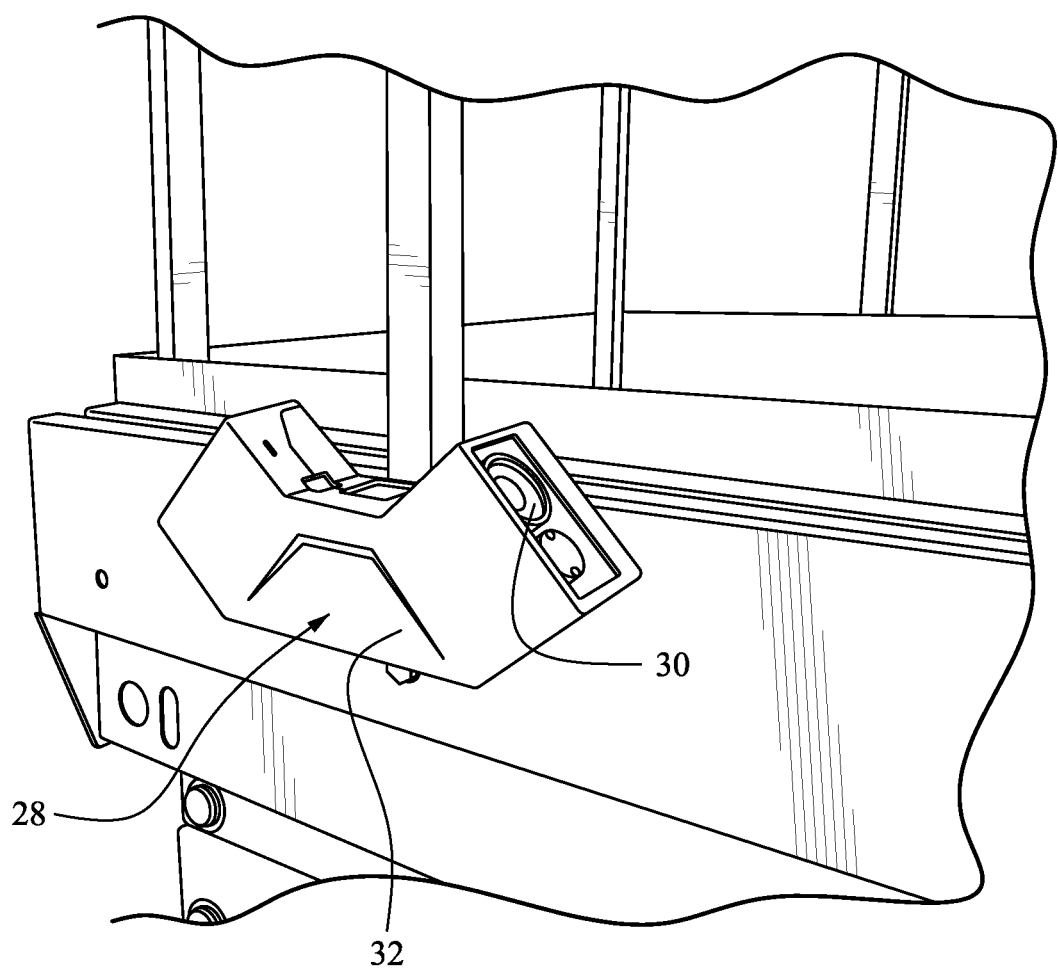
Figure 3:
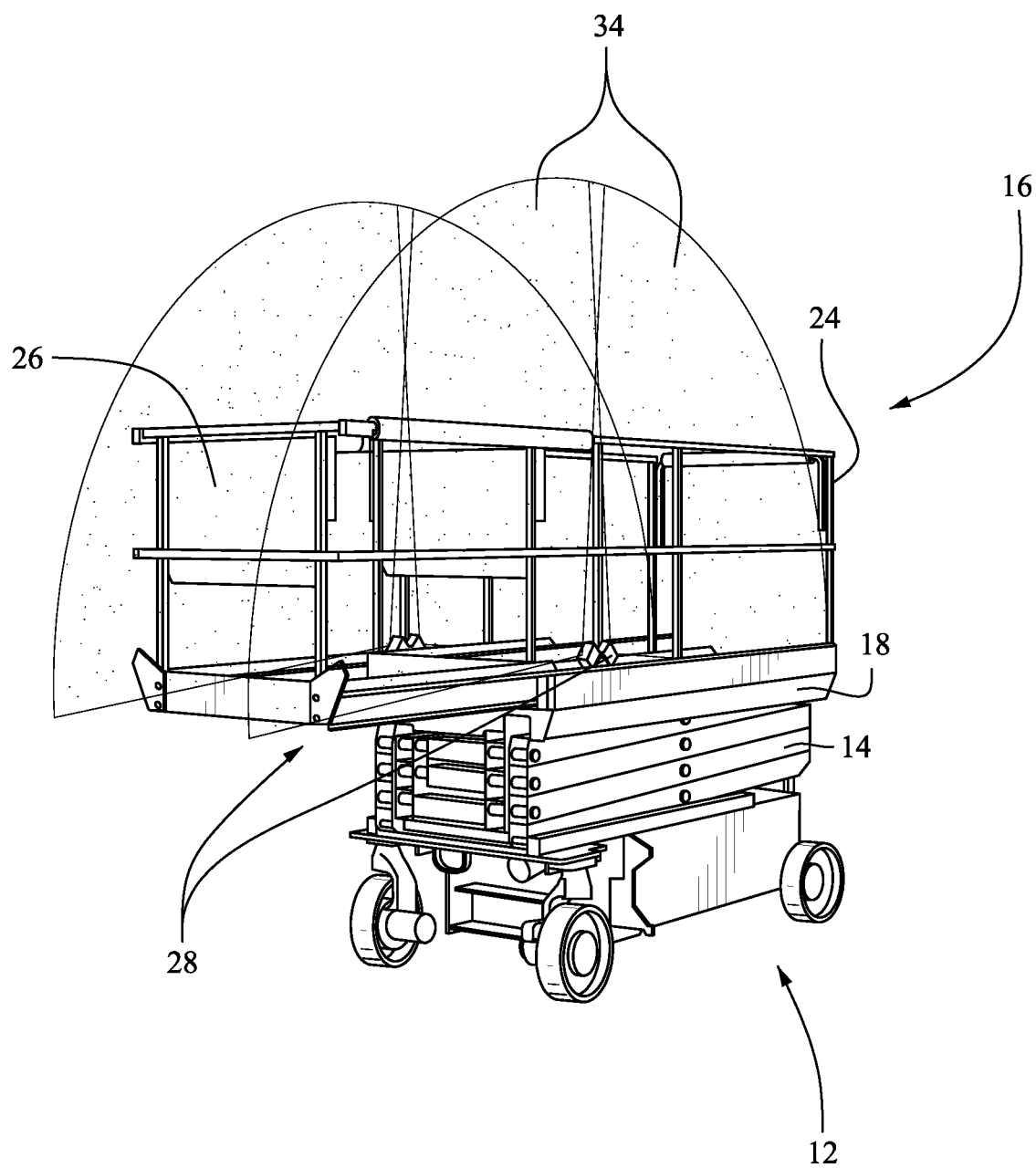
FIG. 3 illustrates the fans of coverage by the sensor units.

The platform assembly 16 includes a work platform 20 with a platform floor 22 and a safety rail 24 extending from the platform floor to a rail height. The work platform 20 may also include a platform extension 26 that is displaceable between a retracted position (FIG. 1) and an extended position (FIG. 3). The platform extension 26 extends the platform in at least one of a forward and a rearward direction in the extended position. In some embodiments, the work platform 20 may include platform extensions 26 at both forward and aft ends. The platform extension 26 telescopes with complementary structure on the platform as is known.

The platform assembly 16 may also include a primary sensor unit 28 secured to the work platform 20. As shown, the primary sensor unit 28 may be positioned on an exterior surface of the work platform 20 adjacent the platform floor 22. With a rectangular shaped platform 20 including two long sides and shorter front and back ends, the primary sensor unit 28 may be positioned on one or both of the long sides.

In some embodiments, each of the primary sensor units 28 includes two sensors 30 facing in substantially opposite directions, where each of the sensors 30 defines a fan of coverage. The sensors 30 detect the presence of a potential obstacle in the detection zone and output a signal to the machine control system. The sensors may use radar, LiDAR or other suitable detection technology. A suitable sensor is the LeddarVu Vu8, available from LeddarTech in Quebec City, Canada.

The sensors 30 are secured within a sensor housing 32 that may be clamped to existing structure and can be positioned depending on the particular application and targeted protection zone(s). The sensors 30 in the housing 32 are oriented about 90° relative to each other. Relative to horizontal (or relative to the platform floor 22), a forward-facing sensor may be angled about 45° relative to horizontal, and a rearward-facing sensor may be angled about 135° (or 45° from the opposite direction) relative to horizontal.

It is desirable to position the sensors 30 in the housing 32 relative to each other such that the fans of coverage at least partially overlap. FIG. 3 shows the overlapping fans of coverage 34. The coverage area may fall between 90-110°. The fans are generally narrow (e.g., 2-5°), and with the sensors 30 close to the platform floor 22, the sensors 30 also cover the area above the platform while also looking forward and to the rear of the machine. Specifically, the sensors are configured to monitor an area from the platform floor 22 to a space above the rail height and forward and aft of the work platform as shown in FIG. 3.

In the exemplary application shown in FIG. 3, the sensor units 28 are positioned on both long sides of the platform in a generally central position relative to the platform with the platform extension 26 in its extended position. To accommodate the platform extension 26, the sensor units 28 are positioned slightly off center (i.e., forward or aft of center) without the platform extension 26 adjacent the platform floor 22.

Figure 4:
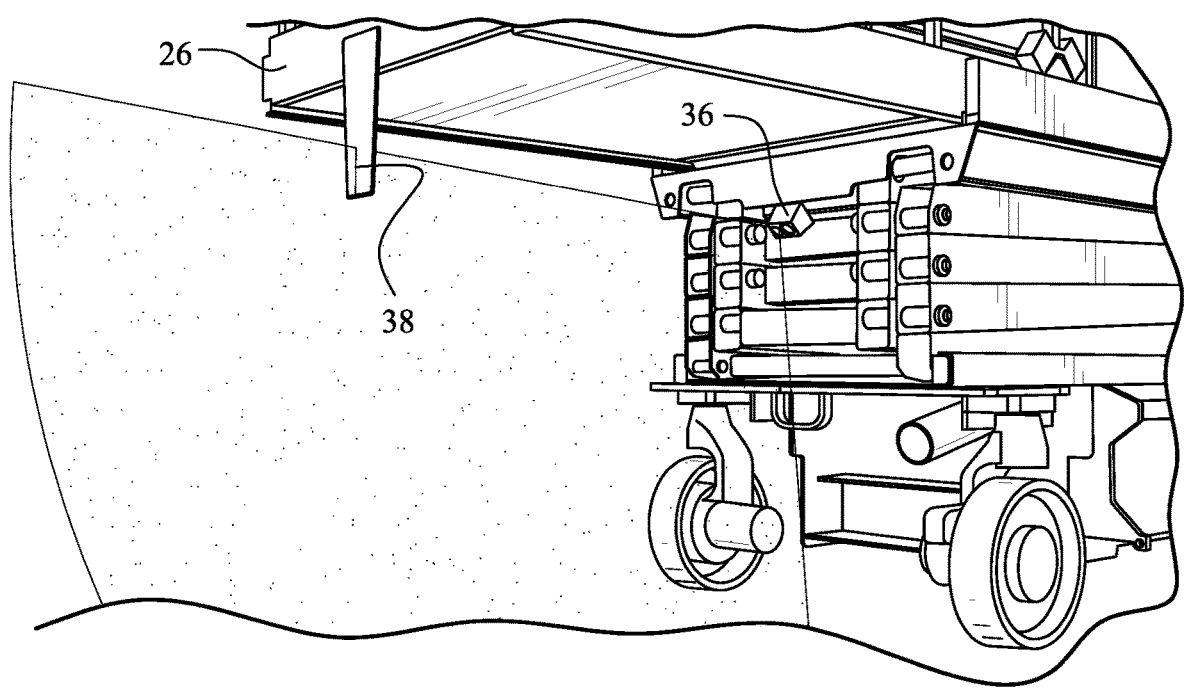
FIG. 4 shows a secondary sensor for the platform extension.

With reference to FIG. 4, the platform assembly may also be provided with a secondary sensor unit 36 positioned adjacent the platform extension 26 and configured to monitor an area below the platform extension 26. As shown, the secondary sensor 36 is fixed relative to the platform extension 26 and may be mounted to the platform base 18. The secondary sensor 36 serves to prevent a potential crushing hazard on any objects/structures below the platform extension 26 in its extended position as shown.

A target panel 38 may be positioned on the platform extension 26 and displaceable with the platform extension 26. The target panel 38 is in a sight line of the secondary sensor 36 with the platform extension 26 in its extended position, whereas the target panel 38 is out of the sight line of the secondary sensor 36 when the platform extension 26 is in the retracted position. The target panel 38 thus allows the sensor 36 to know if the platform extension 26 is extended or retracted. Additional sensors that are positioned and configured to monitor the area below the platform can be utilized to detect objects that are close to the scissor lift (for example when working around sensitive objects like airplanes, glass walls, etc.) and to measure platform height.

In use, the driving components of the vehicle that are cooperable with the lifting assembly for lifting and lowering the work platform are controlled by an operator input implement on a control panel and by a driving/control system communicating with the driving components and the control panel. The control system also receives a signal from the sensor unit(s) 28 and controls operation of the driving components based on signals from the operator input implement and the sensor unit(s) 28. At a minimum, the control system is programmed to shut down driving components when the sensor units 28 detect an obstacle within the coverage area. Alternatively, the control system may reverse the last operation when an obstacle is detected.

If function cutout is selected, when an obstacle is detected, the active function will be stopped immediately, and all non-active functions shall not be activated. If a reversal function is selected, when an obstacle is detected during operation, the operation required RPM target is maintained, and the active function only when an obstacle is detected is reversed until the reversal function is stopped. A ground horn and a platform horn can be activated when the reversal function is active. After the reversal function is completed, engine RPM is set to low, and all functions are disabled until the functions are re-engaged for example with a foot switch and operator controls. The system may include a sensor override button that is used to override the function cut out initiated by the sensor units. If the override button is pressed and held, it enables the lift functions if the foot switch and controls are re-engaged sequentially. In this event, function speed is set in creep mode speed automatically. The controller is programmed to avoid the cut out feature being disabled before the obstacle is detected regardless of whether the override button is pressed or released. This assures that the cut out feature will still be available if the override button is stuck or manipulated into an always-closed position.

The reversal function is implemented for various operating parameters of the machine. If a drive forward request is received when an obstacle is detected, it is treated as a bump or obstacle in the road and will not trigger the reversal function. Reversal function terminates based on the sensor signal, footswitch signal and time parameters that are set for different functions, respectively. If the sensor signal changes from obstacle-detected status to no-obstacle-detected status before the maximum reversal time is elapsed, then the reversal function will be stopped; otherwise, the reversal function is active until the maximum reversal time is elapsed.

Disengaging the footswitch also terminates the reversal function at any time.

If an operator is trapped on the platform, ground control can be accessed from the ground via a switch. In the ground control mode, if the platform switch is engaged, platform operation may be allowed in creep speed. If the sensor units change status from obstacle to no obstacle, then operation is maintained in creep speed unless the ground enable and function control switch is re-engaged.

The platform assembly of the described embodiments incorporates strategically placed sensors for detecting potential obstacles and crushing hazards. Although shown with an application to a scissor lift, the platform assembly is applicable to other work platforms and the like. The platform assembly including the described sensor units serves to enhance protection for an operator from sustained involuntary operation resulting in an impact with an obstruction or structure.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A platform assembly comprising:
a work platform including a platform floor and a safety rail extending from the platform floor to a rail height; and
a primary sensor unit secured to the work platform and positioned adjacent the platform floor, the primary sensor unit being configured to singly monitor an area from the platform floor to a space above the rail height and forward and aft of the work platform.

2. A platform assembly according to claim 1, wherein the primary sensor unit comprises two sensors facing in different directions, each of the sensors defining a fan of coverage, and wherein the sensors are positioned relative to each other such that the fans of coverage at least partially overlap.

3. A platform assembly according to claim 2, wherein the two sensors are oriented 90° relative to each other.

4. A platform assembly according to claim 1, wherein the work platform is rectangular shaped with two long sides and shorter front and back ends, and wherein the primary sensor unit is positioned on at least one of the two long sides.

5. A platform assembly according to claim 1, wherein the work platform comprises a platform extension that is displaceable between a retracted position and an extended position and extends the platform floor in at least one of a forward and a rearward direction in the extended position, the platform assembly further comprising a secondary sensor unit positioned adjacent the platform extension and configured to monitor at least an area directly below the platform extension.

6. A platform assembly according to claim 5, further comprising a target panel positioned on the platform extension and displaceable with the platform extension, wherein the target panel is in a sight line of the secondary sensor in the extended position, and wherein the target panel is out of the sight line of the secondary sensor in the retracted position.

7. A scissor lift comprising:
a wheeled chassis;
an arm stack supported on the wheeled chassis and displaceable between a raised orientation and a lowered orientation; and
a platform assembly supported on the arm stack and displaceable with the arm stack, the platform assembly including:
a work platform including a platform floor and a safety rail extending from the platform floor to a rail height, and
a primary sensor unit secured to the work platform and positioned adjacent the platform floor, the primary sensor unit being configured to singly monitor an area from the platform floor to a space above the rail height and forward and aft of the work platform.

8. A scissor lift according to claim 7, wherein the primary sensor unit comprises two sensors facing in different directions, each of the sensors defining a fan of coverage, and wherein the sensors are positioned relative to each other such that the fans of coverage at least partially overlap.

9. A scissor lift according to claim 7, wherein the work platform comprises a platform extension that is displaceable between a retracted position and an extended position and extends the platform floor in at least one of a forward and a rearward direction in the extended position overhanging the arm stack, the platform assembly further comprising a secondary sensor unit positioned adjacent the platform extension and configured to monitor at least an area directly below the platform extension.

10. A scissor lift according to claim 9, further comprising a target panel positioned on the platform extension and displaceable with the platform extension, wherein the target panel is in a sight line of the secondary sensor in the extended position, and wherein the target panel is out of the sight line of the secondary sensor in the retracted position.

11. A platform assembly comprising:
a work platform including a platform floor, two long sides, and a safety rail extending from the platform floor to a rail height; and
two primary sensor units secured to the work platform and positioned adjacent the platform floor on each of the two long sides, respectively, the primary sensor units being configured to monitor an area from the platform floor to a space above the rail height and forward and aft of the work platform,
wherein the primary sensor units each comprise two sensors facing in different directions, each of the sensors defining a fan of coverage, and wherein the sensors are positioned relative to each other such that the fans of coverage on each side of the platform at least partially overlap.

12. A platform assembly according to claim 11, wherein the two sensors in each of the primary sensor units are oriented 90° relative to each other.

13. A platform assembly according to claim 11, wherein the work platform comprises a platform extension that is displaceable between a retracted position and an extended position and extends the platform floor in at least one of a forward and a rearward direction in the extended position, the platform assembly further comprising a secondary sensor unit positioned adjacent the platform extension and configured to monitor at least an area directly below the platform extension.

14. A platform assembly according to claim 13, further comprising a target panel positioned on the platform extension and displaceable with the platform extension, wherein the target panel is in a sight line of the secondary sensor in the extended position, and wherein the target panel is out of the sight line of the secondary sensor in the retracted position.

* * * * *